US012724551B2

(12) United States Patent
Lee et al.

(10) Patent No.: US 12,724,551 B2
(45) Date of Patent: Sep. 1, 2026

(54) MEMORY CONTROLLER, MEMORY SYSTEM INCLUDING THE SAME AND OPERATING METHOD THEREOF

(71) Applicant: Samsung Electronics Co., Ltd., Suwon-si (KR)

(72) Inventors: Junyeol Lee, Suwon-si (KR); Hyungjin Kim, Suwon-si (KR); Chulseung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/987,084

(22) Filed: Dec. 19, 2024

(65) Prior Publication Data

US 2025/0383790 A1 Dec. 18, 2025

(30) Foreign Application Priority Data

Jun. 14, 2024 (KR) ........................ 10-2024-0077733

(51) Int. Cl.
*G06F 3/06* (2006.01)

(52) U.S. Cl.
CPC .......... *G06F 3/0625* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 7,512,029 | B2 | 3/2009 | Roohparvar | |
| 8,954,771 | B2 | 2/2015 | Sodhi et al. | |
| 11,335,395 | B2 | 5/2022 | Cox et al. | |
| 11,423,954 | B2 | 8/2022 | Kwak | |
| 11,599,301 | B2 | 3/2023 | Lee et al. | |
| 11,681,446 | B2 | 6/2023 | Roumi et al. | |
| 11,935,614 | B2 | 3/2024 | Akamatsu et al. | |
| 2012/0102342 | A1* | 4/2012 | Haj-Yihia | G06F 1/3203 713/320 |
| 2019/0213776 | A1* | 7/2019 | Banerjee | G06F 9/4881 |
| 2023/0410891 | A1 | 12/2023 | Moon et al. | |

FOREIGN PATENT DOCUMENTS

KR 10-1202470 B1 11/2012

* cited by examiner

*Primary Examiner* — Brian R Peugh
(74) *Attorney, Agent, or Firm* — Muir Patent Law, PLLC

(57) ABSTRACT

Provided is a memory controller including an interface including a plurality of pins configured to communicate with a memory apparatus, a queue manager configured to control a first queue to store control information for controlling an operation of the memory apparatus storing or reading data and a second queue to store data transmission information for controlling transmission of the data, and an interface controller configured to shut off power to at least one pin among the plurality of pins based on the first queue and the second queue.

20 Claims, 10 Drawing Sheets

FIG. 7

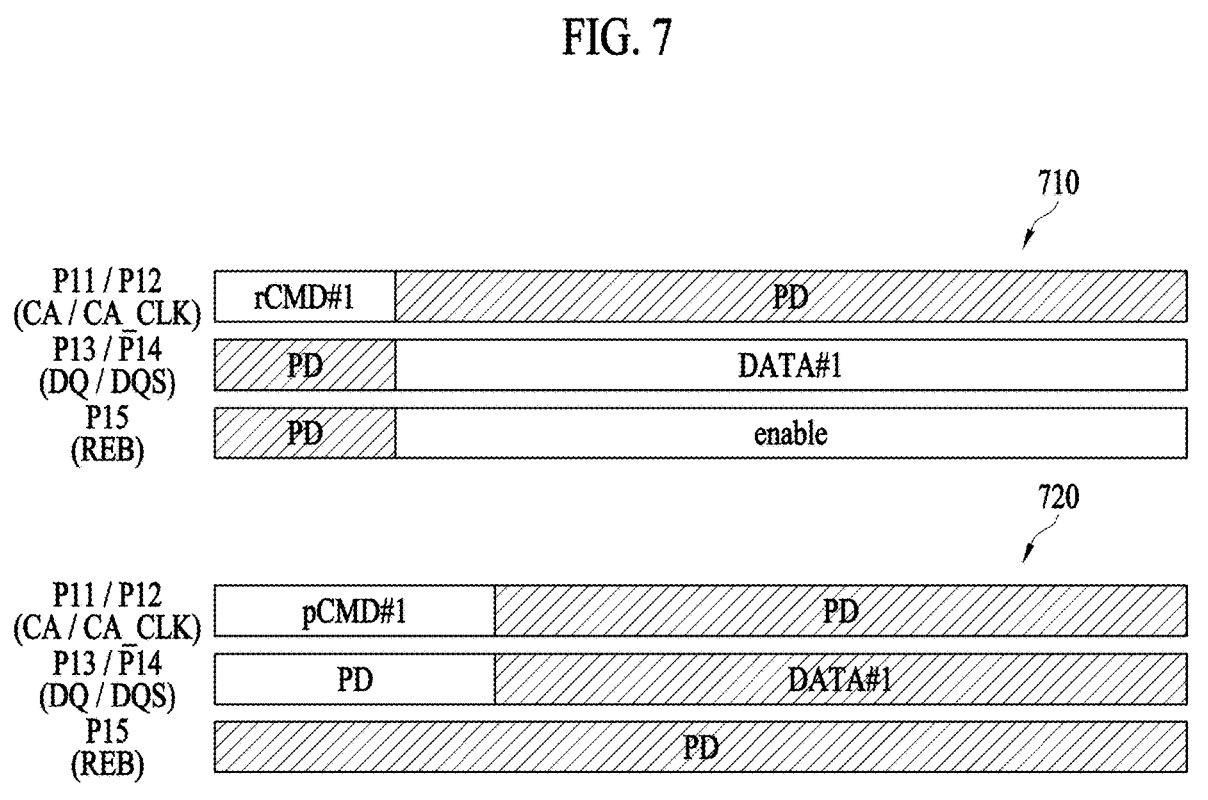

710
P11 / P12 (CA / CA_CLK) | rCMD#1 | PD
P13 / P14 (DQ / DQS) | PD | DATA#1
P15 (REB) | PD | enable 720
P11 / P12 (CA / CA_CLK) | pCMD#1 | PD
P13 / P14 (DQ / DQS) | PD | DATA#1
P15 (REB) | PD

Figure 8:
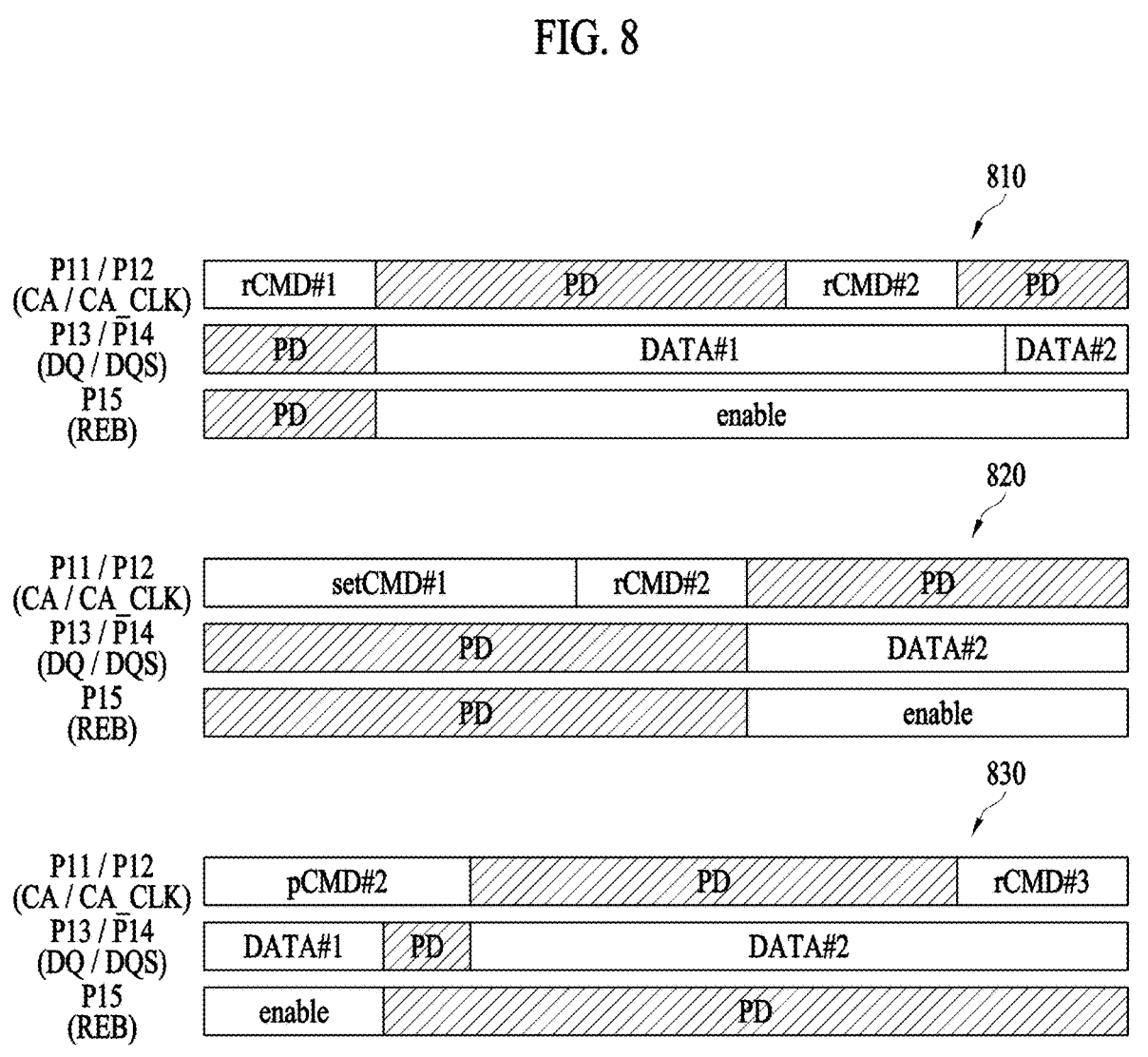

| P11 / P12 (CA / CA_CLK) | rCMD#1 | PD | rCMD#2 | PD |
|---|---|---|---|---|
| P13 / P14 (DQ / DQS) | PD | DATA#1 | DATA#2 | |
| P15 (REB) | PD | enable | | |

820

| P11 / P12 (CA / CA_CLK) | setCMD#1 | rCMD#2 | PD |
|---|---|---|---|
| P13 / P14 (DQ / DQS) | PD | DATA#2 | |
| P15 (REB) | PD | enable | |

830

| P11 / P12 (CA / CA_CLK) | pCMD#2 | PD | rCMD#3 |
|---|---|---|---|
| P13 / P14 (DQ / DQS) | DATA#1 | PD | DATA#2 |
| P15 (REB) | enable | PD | |

MEMORY CONTROLLER, MEMORY SYSTEM INCLUDING THE SAME AND OPERATING METHOD THEREOF

CROSS-REFERENCE TO RELATED APPLICATION(S)

This application claims the benefit under 35 U.S.C. § 119 of Korean Patent Application No. 10-2024-0077733, filed on Jun. 14, 2024, in the Korean Intellectual Property Office, the entire disclosure of which is incorporated herein by reference.

BACKGROUND

1. Field of the Invention

Example embodiments relate to an electronic apparatus, and more particularly, to a memory controller, a memory system including the same, and an operating method thereof.

2. Description of the Related Art

A memory system may be used in various electronic apparatuses. Recently, low-power designing of the memory system has been considered significant. In particular, power management acts significantly in battery-powered electronic apparatuses such as mobile devices, Internet of Things (IoT) devices, and wearable devices.

SUMMARY

An aspect provides a memory controller that reduces power consumption, a memory system including the same, and an operating method thereof.

Example embodiments are not limited to the technical features described herein, and other technical features may be inferred from the example embodiments below.

According to an aspect, there is provided a memory controller including an interface including a plurality of pins configured to communicate with a memory apparatus, a queue manager configured to control a first queue to store control information for controlling an operation of the memory apparatus storing or reading data and a second queue to store data transmission information for controlling transmission of the data, and an interface controller configured to shut off power to at least one pin among the plurality of pins based on the first queue and the second queue.

According to another aspect, there is provided an operating method of a memory controller including a plurality of pins configured to communicate with a memory apparatus, the operating method including identifying a first queue for storing control information for controlling an operation of the memory apparatus storing or reading data and a second queue for storing data transmission information for controlling transmission of the data and shutting off power to at least one pin among the plurality of pins based on the first queue and the second queue.

According to another aspect, there is provided a memory system including a memory apparatus configured to store data and a memory controller configured to identify a first queue for storing control information for controlling an operation of the memory apparatus storing or reading the data and a second queue for storing data transmission information for controlling transmission of the data and to shut off power to at least one pin among a plurality of pins based on the first queue and the second queue.

Additional aspects of example embodiments will be set forth in part in the description which follows and, in part, will be apparent from the description, or may be learned by practice of the disclosure.

According to example embodiments, one or more of the following effects may be obtained.

According to example embodiments, a memory controller that may reduce power consumption, a memory system including the same, and an operating method thereof may be provided. According to example embodiments, it is possible to minimize the latency of a power-down operation.

The effects to be obtained in the present disclosure are not limited to the aforementioned effects, and other unstated effects will be clearly understood by those skilled in the art from the attached claims.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 7 is a timing diagram for one command according to an example embodiment;

FIG. 8 is a timing diagram for a plurality of consecutive commands according to an example embodiment;

DETAILED DESCRIPTION

Figure 1:
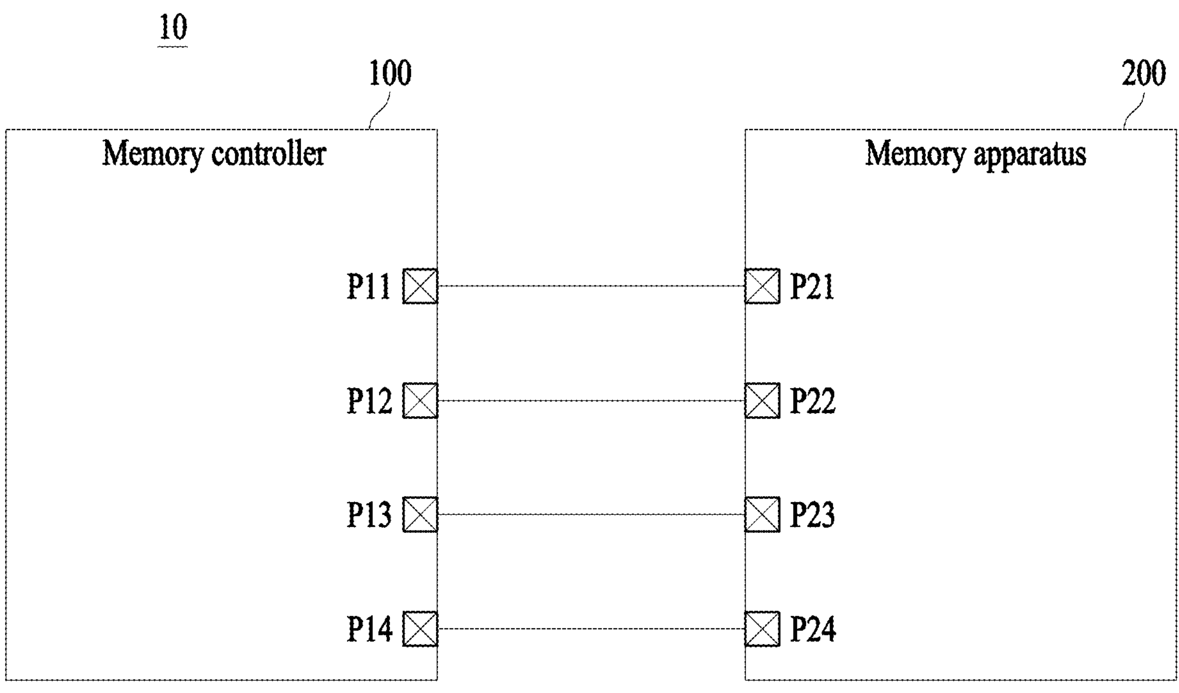
FIG. 1 is a block diagram for illustrating a memory system according to an example embodiment.

Terms used in example embodiments are selected from currently widely used general terms when possible while considering the functions in the present disclosure. However, the terms may vary depending on the intention of a person skilled in the art, precedents, the emergence of new technology, and the like. Further, in certain cases, there are also terms arbitrarily selected by the applicant, and in these cases, the meaning will be described in detail in the corresponding descriptions. Therefore, the terms used in the present disclosure are not to be construed simply as its designation but based on the meaning of the term and the overall context of the present disclosure.

Throughout the specification, when a part is described as "comprising" or "including" a component, it does not exclude another component but may further include another component unless otherwise stated. Furthermore, terms such as " . . . unit," " . . . part," and " . . . module" described in the specification mean a unit that processes at least one function or operation, which may be implemented as hardware, software, or a combination thereof.

Hereinafter, example embodiments of the present disclosure will be described in detail with reference to the accompanying drawings so that those of ordinary skill in the art to which the present disclosure pertains may easily implement them. However, the present disclosure may be implemented in multiple different forms and is not limited to the example embodiments described herein.

Hereinafter, example embodiments of the present disclosure will be described in detail with reference to the accompanying drawings. Like reference characters refer to like elements throughout.

FIG. 1 is a block diagram for illustrating a memory system according to an example embodiment.

Referring to FIG. 1, a memory system 10 according to an example embodiment may be a storage apparatus or an electronic apparatus. For example, the storage apparatus may be implemented as a solid-state drive (SSD), a universal serial bus (USB) flash drive, a memory card (for example, secure digital (SD), SD high capacity (SDHC), an SD extended capacity (SDXC), an SD ultra capacity (SDUC), a microSD, a microSDHC, a microSDXC, microSDUC and the like), a network attached storage (NAS), a direct attached storage (DAS), and a storage area network (SAN). For example, the electronic apparatus may be implemented as a smartphone, a personal computer (PC), a tablet PC, a wearable device, a camera, an automobile, a television (TV), a drone, a medical system, an IoT device, server, and an industrial equipment. However, the storage apparatus and the electronic apparatus are not limited to the examples described above and may be implemented in various forms.

The memory system 10 may include a memory controller 100 and a memory apparatus 200. The memory apparatus 200 may store data according to the control of the memory controller 100 or read and output stored data.

The memory controller 100 may include a plurality of pins P11 to P14. The plurality of pins P11 to P14 may be pins for communicating with the memory apparatus 200. The memory apparatus 200 may include a plurality of pins P21 to P24. The memory controller 100 and the memory apparatus 200 may communicate with each other through the plurality of pins P11 to P14 and P21 to P24. Each of the plurality of pins P11 to P14 of the memory controller 100 is connected to a corresponding pin among the plurality of pins P21 to P24 of the memory apparatus 200, and the memory controller 100 and the memory apparatus 200 may transmit and receive signals through connected pins. In other words, through a connection between a pin of the memory controller 100 and a pin of the memory apparatus 200, a communication channel (or bus) may be formed. Meanwhile, the number of the plurality of pins P11 to P14 and P21 to P24 may be variously modified and implemented. For example, the numbers of pins of the memory controller 100 and the memory apparatus 200 may be greater or fewer than those illustrated.

In an example embodiment, the memory controller 100 may communicate with the memory apparatus 200 according to a separate command address (SCA) protocol. For example, the SCA protocol may be a communication framework in which control information and data are transmitted through different pins. Here, the control information may include at least one of a command for controlling an operation of the memory apparatus 200 and an address indicating a storage area of the memory apparatus 200. In other words, the control information and the data may be transmitted through parallel communication. In the SCA protocol, control information and data may be transmitted in parallel, which thus may lead to a faster transmission speed than a serial protocol. Meanwhile, the serial protocol may be a communication protocol in which control information and data are transmitted in sequence.

In an example embodiment, according to the serial protocol, communication channels of control information and data are not separated and thus a power-down operation of shutting off power may be performed only when no communication operation is present for both the control information and the data. According to an example embodiment of the present disclosure, since communication channels of control information and data are separated, the memory controller 100 may control power to each of the plurality of pins P11 to P14 independently of one another. The memory controller 100 may select a pin without communication operation from the plurality of pins P11 to P14 based on a queue and shut off power. According to an example embodiment of the present disclosure, the memory controller 100 that reduces power consumption, the memory system 10, and an operating method thereof may be provided. Hereinafter, example embodiments of the present disclosure are described in more detail.

Figure 2:
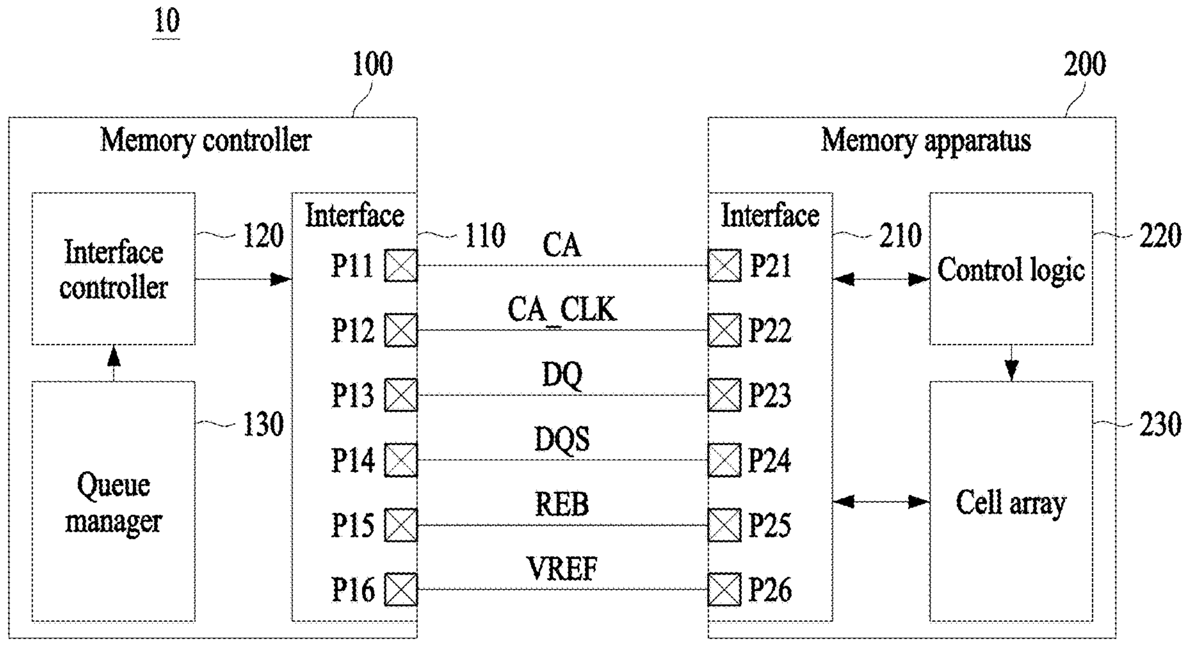
FIG. 2 is a block diagram for illustrating a memory system in detail according to an example embodiment.

FIG. 2 is a block diagram for illustrating a memory system in detail according to an example embodiment.

Referring to FIG. 2, the memory system 10 according to an example embodiment may include the memory controller 100 and the memory apparatus 200.

The memory apparatus 200 may include an interface 210, a control logic 220, and a cell array 230. The cell array 230 may also be referred to as a memory cell array 230. The interface 210 may include a plurality of pins P21 to P26 connected to the memory controller 100. Each of the plurality of pins P21 to P26 of the memory apparatus 200 may be connected to a corresponding pin among a plurality of pins P11 to P16 of the memory controller 100. Each of the plurality of pins P21 to P26 may receive and/or transmit a specific signal from the memory controller 100 and/or to the memory controller 100.

In an example embodiment, the plurality of pins P21 to P26 of the memory apparatus 200 may include a command pin and a data pin. In an example embodiment, the plurality of pins P21 to P26 of the memory apparatus 200 may further include at least one of a read enable pin and a reference voltage pin.

The command pins of the memory apparatus 200 may be pins for receiving control information CA from the memory controller 100. The control information CA may include at least one of a command for controlling an operation of the memory apparatus 200 and an address indicating a storage area of the memory apparatus 200. In an example embodiment, the command pins may include the first pin P21 that receives the control information CA and the second pin P22 that receives a control clock signal CA_CLK for synchronizing the control information CA. The data pins of the memory apparatus 200 may be pins for transmitting or receiving data DQ to the memory controller 100 or from the memory controller 100. In an example embodiment, the data pins may include the third pin P23 that transmits and receives the data DQ and the fourth pin P24 that transmits and receives a data strobe signal DQS for synchronizing the data DQ. The read enable pin of the memory apparatus 200 may include the fifth pin P25 that receives a read enable signal REB. The reference voltage pin of the memory apparatus 200 may include the sixth pin P26 that receives a reference voltage VREF. In an example embodiment, the sixth pin P26 may be omitted.

The control logic 220 of the memory apparatus 200 may control an operation of the memory apparatus 200. For example, the control logic 220 may generate and transfer a control signal for controlling another component of the memory apparatus 200. For example, the control logic 220 may program the cell array 230 with data or generate a control signal for reading data from the cell array 230.

The cell array 230 of the memory apparatus 200 may include a plurality of storage areas. The storage area may include a plurality of memory cells. The memory cell may represent a minimum unit of storing data. In an example embodiment, the memory cell may be a non-volatile memory element. For example, the memory cell may be NAND flash memory which stores data using a floating gate transistor. However, the memory cell is not limited thereto and may be modified and implemented in various types such as NOR flash memory with cells arranged in parallel, ferroelectric random access memory (FRAM) which stores data using ferroelectric materials, resistive random access memory (RRAM) which stores data by changing a resistance state of a material, phase-change random access memory (PCRAM) which stores data using phase-change materials, and magnetic random access memory (MRAM) which stores data using a magnetic tunnel junction.

The control logic 220 of the memory apparatus 200 may receive the control information CA through the interface 210. The control information CA may include at least one of a command and an address. The control logic 220 may perform an operation corresponding to the command for a storage area corresponding to the address. The type of the command may be one of a program command and a read command. The program command is a command that instructs performing a program operation of storing data, and the read command is a command that instructs performing a read operation of reading stored data. However, this is merely one example embodiment, and the command may be one of various types of commands other than this. The address may be a physical address indicating storage areas in the cell array 230.

For example, when a program command and an address are received through the interface 210 of the memory apparatus 200, the control logic 220 may perform the program operation so that data received through the interface 210 is stored in a storage area of the cell array 230 corresponding to the address. For example, when a read command and an address are received through the interface 210, the control logic 220 may perform the read operation so that data stored in a storage area of the cell array 230 corresponding to the address is read.

The memory controller 100 may include an interface 110, an interface controller 120, and a queue manager 130. The interface 110 of the memory controller 100 may include the plurality of pins P11 to P16 connected to the memory apparatus 200. Each of the plurality of pins P11 to P16 of the memory controller 100 may be connected to a corresponding pin among the plurality of pins P21 to P26 of the memory apparatus 200. While power is supplied, each of the plurality of pins P11 to P16 may receive or transmit a specific signal from the memory apparatus 200 or to the memory apparatus 200.

In an example embodiment, the plurality of pins P11 to P16 of the memory controller 100 may include a command pin and a data pin. In an example embodiment, the plurality of pins P11 to P16 of the memory controller 100 may further include at least one of a read enable pin and a reference voltage pin.

The command pins of the memory controller 100 may be pins for transmitting the control information CA and the control clock signal CA_CLK from the memory controller 100 to the memory apparatus 200. The control information CA may include a command and an address. In an example embodiment, the command pin may include the first pin P11 that transmits the control information CA and the second pin P12 that transmits the control clock signal CA_CLK for synchronizing the control information CA. In an example embodiment, the first pin P11 may transmit a command and an address in sequence.

Meanwhile, the first pin P11 may include a plurality of sub-pins that transmit the control information CA. For example, the first pin P11 may include a first sub-pin that transmits and receives a first data bit (for example, CA[0]) of the control information CA and a second sub-pin that transmits and receives a second data bit (for example, CA[1]) of the control information CA. In an example embodiment, through the plurality of sub-pins, the control information CA may be transmitted from the memory controller 100 to the memory apparatus 200, or a clock signal and data may be received from the memory apparatus 200 by the memory controller 100. For example, the first sub-pin and the second sub-pin of the memory controller 100 may transmit the control information CA including a state information command for controlling that state information is output to the memory apparatus 200, and the second pin P12 of the memory controller 100 may transmit the control clock signal CA_CLK to the memory apparatus 200. In this case, the memory controller 100 may receive a clock signal corresponding to the control clock signal CA_CLK from the memory apparatus 200 through the second sub-pin and receive state information corresponding to the state information command from the memory apparatus 200 through the first sub-pin. Meanwhile, for another example in this case, the memory controller 100 may receive a clock signal from the memory apparatus 200 through the first sub-pin and receive state information from the memory apparatus 200 through the second sub-pin. Meanwhile, the example embodiment described above is merely one example embodiment, and the first pin P11 may be one pin that transmits the control information CA by a unit of 1 bit in sequence.

In an example embodiment, the memory controller 100 may transmit the control clock signal CA_CLK to the memory apparatus 200 through the second pin P12 and transmit the control information CA synchronized with the control clock signal CA_CLK to the memory apparatus 200 through the first pin P11. Here, the control clock signal CA_CLK may be a signal whose state (for example, a high state and a low state) toggles (or changes) periodically. For example, the memory controller 100 may transmit the control clock signal CA_CLK to the memory apparatus 200 through the second pin P12 and transmit the control information CA to the memory apparatus 200 through the first pin P11 according to toggle timing of the control clock signal CA_CLK. In this case, the memory apparatus 200 may receive the control clock signal CA_CLK through the second pin P22 and receive the control information CA through the first pin P21. The memory apparatus 200 may sample the control information CA according to toggle timing of the control clock signal CA_CLK and read a value. For example, the toggle timing may be a time point in which the control clock signal CA_CLK is at a rising edge or a falling edge.

The data pin of the memory controller 100 may be a pin for transmitting the data DQ to the memory apparatus 200 or receiving the data DQ from the memory apparatus 200. In an example embodiment, the data pin may include the third pin P13 that transmits and receives the data DQ and the fourth pin P14 that transmits and receives the data strobe signal DQS for synchronizing the data DQ. For example, the data DQ to be stored in the memory apparatus 200 according to a program operation may be transmitted from the memory controller 100 to the memory apparatus 200 through the third pin P13. For example, the data DQ output from the memory apparatus 200 according to a read operation may be received by the memory controller 100 through the third pin P13. In an example embodiment, the third pin P13 may be eight pins that transmit the data DQ by a unit of 8 bits. For example, the third pin P13 may include eight sub-pins that transmit the data DQ as a unit of 8 bits in parallel, with each sub-pin transmitting 1 bit. However, this is merely one example embodiment, and the third pin P13 may be modified and implemented in various numbers of sub-pins such as 16 sub-pins that transmit the data DQ by a unit of 16 bits. According to an example embodiment of the present disclosure, the control information CA and the data DQ may be transmitted through separate pins.

In an example embodiment, the memory controller 100 may transmit the data strobe signal DQS to the memory apparatus 200 through the fourth pin P14 and transmit the data DQ synchronized with the data strobe signal DQS to the memory apparatus 200 through the third pin P13. Here, the data strobe signal DQS may be a signal whose state (for example, a high state and a low state) toggles (or changes) periodically. For example, the memory controller 100 may transmit the data DQ to the memory apparatus 200 through the third pin P13 according to toggle timing of the data strobe signal DQS. The memory apparatus 200 may receive the data strobe signal DQS through the fourth pin P24 and receive the data DQ through the third pin P23. The memory apparatus 200 may sample the data DQ according to toggle timing of the data strobe signal DQS and read a value. For example, the toggle timing may be a time point in which the data strobe signal DQS is at a rising edge or a falling edge.

The read enable pin may include the fifth pin P15 for transmitting the read enable signal REB. The read enable signal REB may be a signal for controlling an output of the data DQ. For example, the read enable signal REB may be a signal for controlling timing with which the data DQ stored in the memory apparatus 200 is output through the fifth pin P25 of the memory apparatus 200. In other words, using the read enable signal REB, the memory controller 100 may control a time point in which the memory apparatus 200 outputs the data DQ. In an example embodiment, the read enable signal REB may be a clock signal with a lower frequency than the data strobe signal DQS.

In an example embodiment, when the read enable signal REB is received through the fifth pin P25, the memory apparatus 200 may generate the data strobe signal DQS using the read enable signal REB. The memory apparatus 200 may transmit the data strobe signal DQS to the memory controller 100 through the fourth pin P24 and transmit the data DQ synchronized with the data strobe signal DQS to the memory controller 100 through the third pin P23.

The reference voltage pin of the memory controller 100 may include the sixth pin P16 that provides the reference voltage VREF. The reference voltage VREF is voltage for comparing to signals transmitted and received through other pins and may have a voltage level to be a reference of comparison. For example, when a voltage level of a specific pin is higher than a voltage level of a reference voltage, a signal of the specific pin may be interpreted as a digital value "1", and when a voltage level of a specific pin is lower than a voltage level of a reference voltage, a signal of the specific pin may be interpreted as a digital value "0". In an example embodiment, the sixth pin P16 of the memory controller 100 may not be connected to the sixth pin P26 of the memory apparatus 200. In this case, the memory apparatus 200 may generate the reference voltage VREF or receive the reference voltage VREF from an external device other than the memory controller 100. In another example embodiment, the sixth pin P16 of the memory controller 100 may be connected to the sixth pin P26 of the memory apparatus 200. In this case, the memory apparatus 200 may receive the reference voltage VREF from the memory controller 100 through the sixth pin P26.

The interface controller 120 of the memory controller 100 may control a communication operation of the interface 110. The interface controller 120 may monitor information received from the queue manager 130 or a queue. In an example embodiment, the interface controller 120 may generate and transmit various signals for communicating with the memory apparatus 200 to the interface 110 based on the information received from the queue manager 130 or the queue.

The interface controller 120 may control the plurality of pins P11 to P16 so that various signals such as the control information CA and the data DQ may be transmitted and received. The interface controller 120 may control power to each of the plurality of pins P11 to P16 independently of one another. The interface controller 120 may shut off power to a pin where a signal is not transmitted and received. For example, when a time period without a communication operation of the data DQ through the third pin P13 is identified, the interface controller 120 may shut off power to the third pin P13 for the corresponding time period. As in above, the interface controller 120 may shut off or maintain power to each of the plurality of pins P11 to P16 individually. Accordingly, the power consumption of the memory controller 100 and the memory system 10 including the same may be reduced.

The queue manager 130 may manage a queue. The queue manager 130 may store work information inputted to the queue and output work information of completed work. The work information may represent an operation that is to be processed. In an example embodiment, the queue manager 130 may store the work information in the queue in sequence based on an order of a request input. The queue manager 130 may perform an operation according to the work information stored in the queue. Meanwhile, the queue manager 130 may periodically identify a state of the queue. In an example embodiment, the queue manager 130 may transfer information indicating the state of the queue or information corresponding to the work information stored in the queue to the interface controller 120. In an example embodiment, the queue manager 130 may be implemented as a form of a dedicated circuit that performs an operation of managing a queue or a general-purpose processing circuit (for example, a processor included in the memory controller 100 or the like).

The interface controller 120 according to an example embodiment may shut off power to at least one pin among the plurality of pins P11 to P16 based on a first queue and a second queue among a plurality of queues. In other words, the memory controller 100 may control power to each of the plurality of pins P11 to P16 independently of one another. For example, the memory controller 100 may shut off or maintain power to each of the plurality of pins P11 to P16 independently of one another. Here, the first queue may be a queue for storing the control information CA to be transmitted to the memory apparatus 200 and the second queue may be a queue for storing data transmission information for controlling transmission of the data DQ. In an example embodiment, the data transmission information may include at least one of information for controlling a transmission start of the data DQ, information indicating a transmission time of the data DQ, and information indicating a type of the data DQ.

Figure 3:
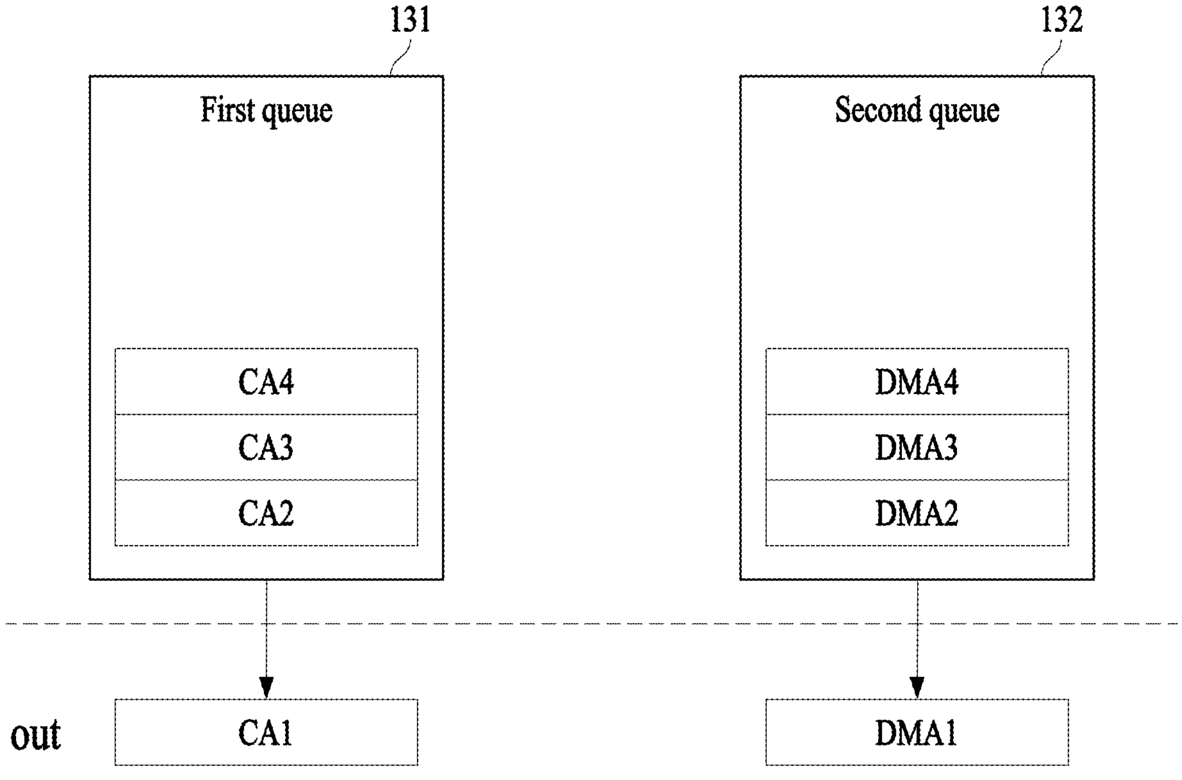
FIG. 3 is a diagram for illustrating a queue according to an example embodiment.

FIG. 3 is a diagram for illustrating a queue according to an example embodiment.

Referring to FIGS. 2 and 3, a plurality of queues according to an example embodiment may include a first queue 131 and a second queue 132. In an example embodiment, each queue may be implemented as a form included in the queue manager 130 or implemented as a form separated from the queue manager 130. In an example embodiment, the queue may be implemented as a form of dedicated memory or implemented as a form of a portion of a storage area allocated to general-purpose memory (for example, buffer memory or RAM included in the memory controller 100).

The first queue 131 may be a queue for storing control information CA1 to CA4 to be transmitted to the memory apparatus 200. The second queue 132 may be a queue for storing data transmission information DMA1 to DMA4 for controlling transmission of the data DQ. In other words, the control information CA1 to CA4 stored in the first queue 131 may be information with a different attribute from the data transmission information DMA1 to DMA4 stored in the second queue 132. The control information CA1 to CA4 may be information related to a command pin and the data transmission information DMA1 to DMA4 may be information related to a data pin. The control information CA1 to CA4 may include at least one of a command and an address and the data transmission information DMA1 to DMA4 may include information indicating a type of data. The command may be one of various types of commands such as a program command and a read command. The data may be one of write data and read data. The write data may be data to be stored in the memory apparatus 200 through a program operation. The read data may be data read from the memory apparatus 200 through a read operation.

For example, when a first request for a program operation is inputted in an empty state of the first queue 131 and the second queue 132, the queue manager 130 may store the first control information CA1 corresponding to the first request in the first queue 131 and store the first data transmission information DMA1 in the second queue 132. The first control information CA1 may include a program command for controlling that the program operation is performed and an address indicating a storage area in the memory apparatus 200 where the program operation is performed. The first data transmission information DMA1 may include information indicating that a type of data to be transmitted is write data.

Then, when a second request for a read operation is inputted, the queue manager 130 may store the second control information CA2 corresponding to the second request in the first queue 131 and store the second data transmission information DMA2 in the second queue 132. The second control information CA2 may include a read command for controlling that the read operation is performed and an address indicating a storage area in the memory apparatus 200 where the read operation is performed. The second data transmission information DMA2 may include information indicating that a type of data to be transmitted is read data. In such a manner, the queue manager 130 may store control information corresponding to a request in sequence in the first queue 131 based on an order of a request input and store data transmission information corresponding to the request in sequence in the second queue 132.

Meanwhile, the queue manager 130 may process (or execute) and output the control information CA1 to CA4 and the data transmission information DMA1 to DMA4 stored in the first queue 131 and the second queue 132, respectively, based on an order independently of each other. The order may be an order of storage or an order of priority. In an example embodiment, the queue manager 130 may execute an operation according to the first control information CA1 stored first in the first queue 131 earliest in the order. Independently thereof, the queue manager 130 may execute an operation according to the first data transmission information DMA1 stored first in the second queue 132 earliest in the order. In other words, the order in which data is stored in the queue may be the same as the order in which it is output from the queue (or the execution order).

In an example embodiment, the queue manager 130 may transfer the first control information CA1 stored first in the first queue 131 to the interface controller 120. In this case, when the first control information CA1 is received, the interface controller 120 may control the interface 110 so that the first control information CA1 is transmitted to the memory apparatus 200. For example, the interface 110 may transmit the control clock signal CA_CLK to the memory apparatus 200 through the second pin P12 and transmit the first control information CA1 to the memory apparatus 200 through the first pin P11 according to toggle timing of the control clock signal CA_CLK. When transmitting the first control information CA1 is completed, the queue manager 130 may output (or delete) the first control information CA1 from the first queue 131. The interface 210 of the memory apparatus 200 may transfer the first control information CA1 received through the first pin P21 to the control logic 220.

In an example embodiment, the queue manager 130 may transfer a control signal for controlling that data is transmitted and received to the interface controller 120 according to the first data transmission information DMA1 stored first in the second queue 132. For example, when the control signal is received, the interface controller 120 may control the interface 110 so that write data corresponding to the first data transmission information DMA1 is transmitted. In an example embodiment, the write data may be stored in buffer memory included in the memory controller 100 but may be implemented in other modified positions. The interface 110 may transmit the data strobe signal DQS to the memory apparatus 200 through the fourth pin P14 and transmit the write data to the memory apparatus 200 through the third pin P13 according to toggle timing of the data strobe signal DQS. When transmitting the write data is completed, the queue manager 130 may output (or delete) the first data transmission information DMA1 from the second queue. The interface 210 of the memory apparatus 200 may transfer the write data received through the third pin P23 to the cell array 230. The control logic 220 may perform a program operation of storing the write data in a storage area of the cell array 230 according to the first control information CA1 received. In such a manner, control information stored in the first queue 131 and data transmission information stored in the second queue 132 may be processed independently of one another. Meanwhile, when the control information CA1 to CA4 stored in the first queue 131 is all output, the first queue 131 may become in an empty state. When the data transmission information DMA1 to DMA4 stored in the second queue 132 is all output, the second queue 132 may become in an empty state. For example, an empty state of a queue may be a state in which work information that is to be processed is no longer stored.

Meanwhile, the interface controller 120 may control each of the plurality of pins P11 to P16 based on the first queue 131 and the second queue 132, which is described in detail with reference to FIGS. 4 to 6.

Figure 4:
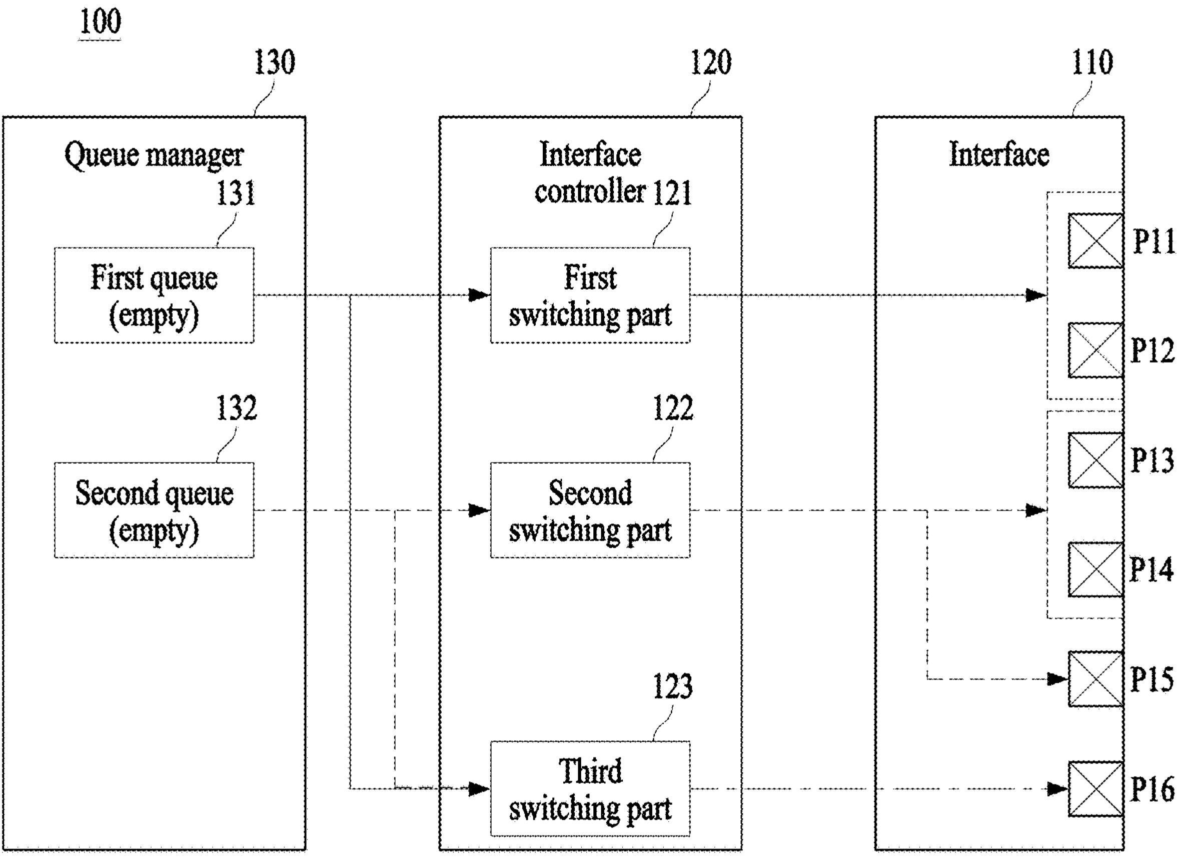
FIGS. 4 to 6 are diagrams for illustrating an operation of a memory controller according to an example embodiment.
Figure 5:
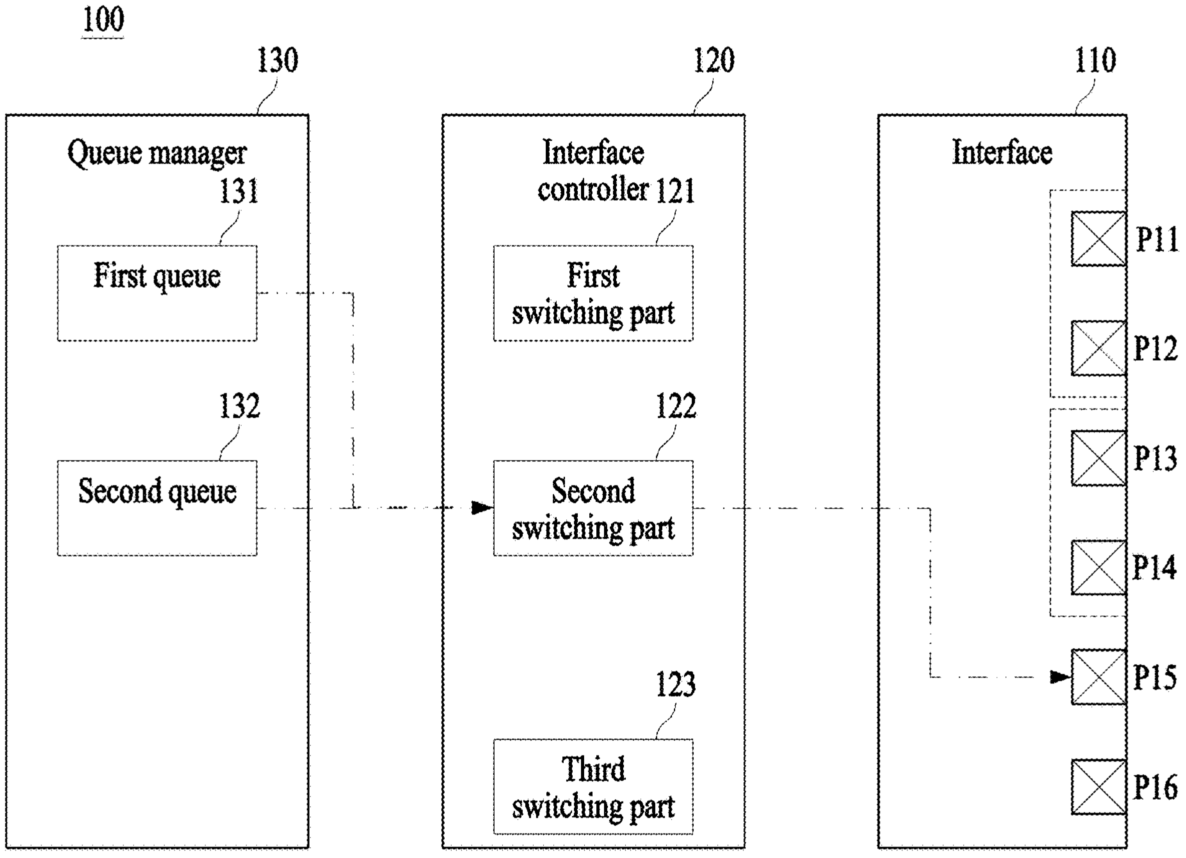
Figure 6:
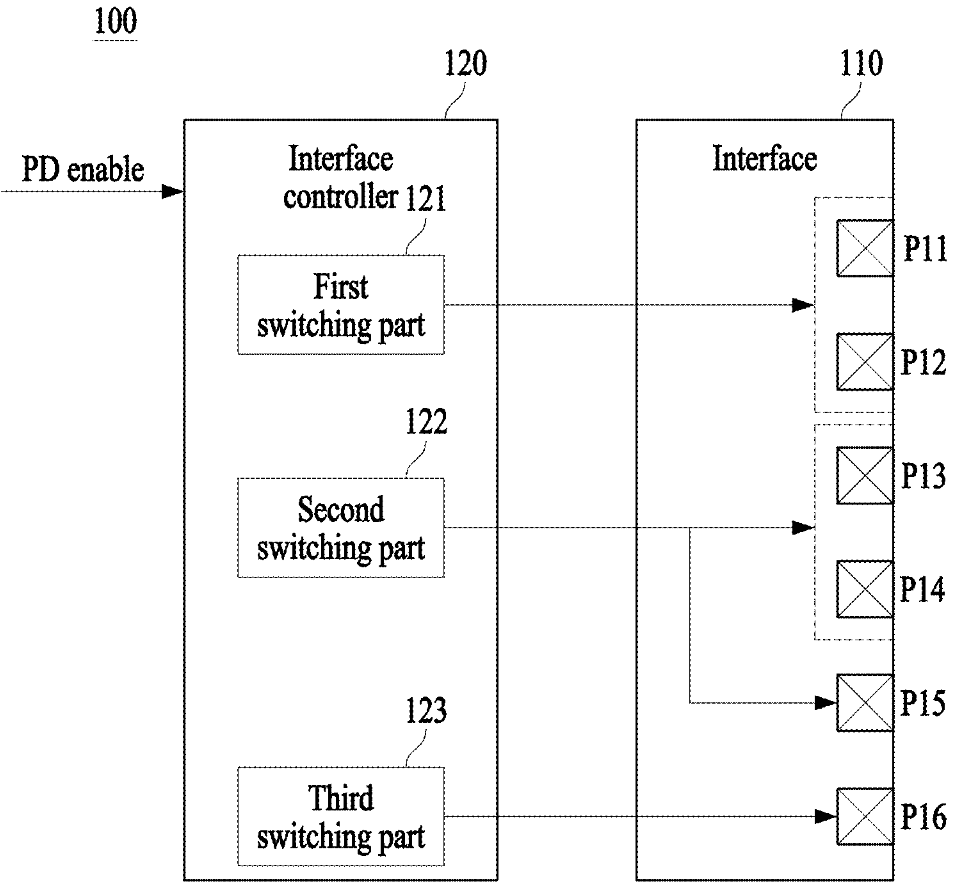

FIGS. 4 to 6 are diagrams for illustrating an operation of a memory controller according to an example embodiment.

Referring to FIGS. 4 to 6, the memory controller 100 may include the interface 110 including the plurality of pins P11 to P16, the interface controller 120, and the queue manager 130.

The interface controller 120 may shut off power to at least one pin among the plurality of pins P11 to P16 based on the first queue 131 and the second queue 132. Here, the power may be voltage supplied to be used for communication of each pin P11 to P16. For example, a voltage level of the power may be VCCQ. The voltage level of the power may be a level greater than a voltage level of a reference voltage.

Specifically, the queue manager 130 may periodically identify the first queue 131 and the second queue 132 and transfer state information of the first queue 131 and state information of the second queue 132 to the interface controller 120. For example, state information of a queue may be information indicating whether the queue is in an empty state. For another example, the interface controller 120 may periodically identify a state of the first queue 131 and a state of the second queue 132.

Referring to FIGS. 2 and 4, when the first queue 131 is in an empty state, the interface controller 120 according to an example embodiment may shut off power to a command pin among the plurality of pins P11 to P16. In an example embodiment, the command pin may include at least one of the first pin P11 that transmits the control information CA and the second pin P12 that transmits the control clock signal CA_CLK for synchronizing the control information CA. For example, when it is identified that the first queue 131 is in the empty state, the interface controller 120 may shut off power to at least one of the first pin P11 and the second pin P12.

Independently thereof, when the second queue 132 is in an empty state, the interface controller 120 may shut off power to a data pin among the plurality of pins P11 to P16. In an example embodiment, the data pin may include at least one of the third pin P13 that transmits or receives the data DQ and the fourth pin P14 that transmits or receives the data strobe signal DQS for synchronizing the data DQ. For example, when it is identified that the second queue 132 is in the empty state, the interface controller 120 may shut off power to at least one of the third pin P13 and the fourth pin P14.

In an example embodiment, when the second queue 132 is in the empty state, the interface controller 120 may shut off power to a read enable pin among the plurality of pins P11 to P16. The read enable pin may include the fifth pin P15 that transmits the read enable signal REB. In an example embodiment, when the second queue 132 is in the empty state, the interface controller 120 may shut off power to the data pin and the read enable pin together. For example, when it is identified that the second queue 132 is in the empty state, the interface controller 120 may shut off power to the third pin P13 to the fifth pin P15 together (or simultaneously).

In an example embodiment, when the first queue 131 and the second queue 132 are in the empty state, the interface controller 120 may shut off power to a reference voltage pin among the plurality of pins P11 to P16. The reference voltage pin may include the sixth pin P16 that transmits the reference voltage VREF. For example, when the first queue 131 and the second queue 132 are both in the empty state, the interface controller 120 may additionally shut off power to the sixth pin P16. In other words, the power to the first to sixth pins P11 to P16 may be shut off together (or simultaneously).

Referring to FIG. 5, the second queue 132 according to an example embodiment may be in a state in which data transmission information is stored. In other words, when data transmission information stored in the second queue 132 is present, the interface controller 120 may shut off power to the read enable pin based on a type of data indicated by the data transmission information.

The data transmission information may include information on a type of transmitted data. In an example embodiment, the type of data may be write data or read data. The write data may be data to be stored in the memory apparatus 200 and the read data may be data read from data stored in the memory apparatus 200. For example, the memory controller 100 may transmit the write data to the memory apparatus 200 through a data pin. In this case, the memory apparatus 200 may store the write data in a storage area through a program operation. For another example, the memory apparatus 200 may obtain the read data from a storage area through a read operation and transmit the read data to the memory controller 100 according to the control of the memory controller 100. For another example, the memory apparatus 200 may read the read data from a storage area (e.g., cell array 230) through a read operation, and may transmit the read data to the memory controller 100 in response to control information (e.g., control information CA) received from the memory controller 100. In this case, the memory controller 100 may receive the read data from the memory apparatus 200 through a data pin.

In an example embodiment, when a type of data indicated by data transmission information is read data, the interface controller 120 may maintain power to the read enable pin while receiving the data through a data pin. For example, the interface controller 120 may maintain power to the read enable pin for a time when the read data is received through the data pin according to the data transmission information output from the second queue 132. In this case, the interface controller 120 may transmit a read enable signal (e.g., read enable signal REB) to the memory apparatus 200 through the read enable pin.

In an example embodiment, when a type of data indicated by data transmission information is write data, the interface controller 120 may shut off power to the read enable pin while transmitting the write data through a data pin. In other words, the interface controller 120 may shut off power to the read enable pin when the type of data indicated by data transmission information is not read data.

According to another example embodiment, the first queue 131 may store control information and the second queue 132 may store data transmission information corresponding to the control information. In other words, when control information stored in the first queue 131 is present and data transmission information stored in the second queue 132 is present, the interface controller 120 may identify a type of data transmitted according to the data transmission information based on a type of a command included in the control information of the first queue 131. For example, when the command is a program command, the transmitted data may be write data. For another example, when the command is a read command, the transmitted data may be read data.

In this case, when the type of the command is the program command, the interface controller 120 may shut off power to the read enable pin (e.g., fifth pin P15) while data is transmitted through a data pin (e.g., third pin P13) according to data transmission information. When the type of the command is the read command, the interface controller 120 may maintain power to the read enable pin (e.g., fifth pin P15) while data is received through a data pin (e.g., third pin P13) according to data transmission information.

According to an example embodiment of the present disclosure, the memory controller 100 may shut off power to the read enable pin (e.g., fifth pin P15) based on a type (or attribute) of data transmitted. Accordingly, the power consumption of the memory controller 100 may be effectively reduced.

Referring to FIG. 6, the interface controller 120 according to an example embodiment may shut off power to each of the plurality of pins P11 to P16 according to a power-down signal (PD enable) received from outside. For example, when the power-down signal (PD enable) is received, the interface controller 120 may shut off all power to each of the plurality of pins P11 to P16.

In an example embodiment, the power-down signal (PD enable) may be a control signal that is received from an external device of the memory controller 100. For example, the external device may be a host device communicating with the memory controller 100 and may be an external processor. The external device may identify whether the memory apparatus 200 is in a standby state (or idle state) in which an operation is not performed through the memory controller 100. When it is identified that the memory apparatus 200 is in the standby state, the external device may transmit the power-down signal (PD enable) to the memory controller 100.

In an example embodiment, the interface controller 120 may include at least one of a first switching part 121 connected to a command pin (e.g., first pin P11 and/or second pin P12), a second switching part 122 connected to at least one of a data pin and a read enable pin (e.g., third pin P13, fourth pin P14, and/or fifth P15), and a third switching part 123 connected to a reference voltage pin (e.g., sixth pin P16). Each of the first to third switching parts 121 to 123 may be implemented as a form of a switching element or a switching circuit that shuts off (for example, turns off) or maintains (for example, turns on) power supplied to a pin.

For example, when information indicating an empty state of the first queue 131 or the power-down signal (PD enable) is received, the first switching part 121 may switch to shut off power to the command pin (e.g., first pin P11 and/or second pin P12). When information indicating an empty state of the second queue 132 or the power-down signal (PD enable) is received, the second switching part 122 may switch to shut off power to the data pin (e.g., third pin P13 and/or fourth pin P14). In an example embodiment, when information indicating an empty state of the second queue 132 or the power-down signal (PD enable) is received, the second switching part 122 may switch to shut off power to both the data pin and the read enable pin (e.g., third pin P13 and/or fourth pin P14 and fifth pin P15). In an example embodiment, the second switching part 122 may switch to maintain power to the read enable pin (e.g., fifth pin P15) when data transmission information being processed in the second queue 132 indicates read data. In an example embodiment, the second switching part 122 may switch to shut off power to the read enable pin (e.g., fifth pin P15) when the data transmission information indicates write data. When information indicating the empty state of both the first queue 131 and the second queue 132 or the power-down signal (PD enable) is received, the third switching part 123 may switch to shut off power to the reference voltage pin (e.g., sixth pin P16).

Meanwhile, when the power to the plurality of pins P11 to P16 is shut off using the power-down signal (PD enable) alone, the latency of an operation of shutting off power may be increased according to a process of transferring a signal and a condition that the memory apparatus 200 is not to perform every operation. According to the present disclosure, as the interface controller 120 shuts off power to the plurality of pins P11 to P16 independently of one another based on a queue, the latency may be decreased effectively and power consumption also may be reduced effectively.

In an example embodiment, the power-down signal (PD enable) may be a signal defined in a protocol for implementing a system bus with high performance and high bandwidth. For example, the corresponding protocol may be one of various protocols such as an advanced high-performance bus (AHB) protocol.

FIG. 7 is a timing diagram for one command according to an example embodiment. FIG. 8 is a timing diagram for a plurality of consecutive commands according to an example embodiment.

Referring to FIGS. 7 and 8, the memory controller 100 may transmit and receive signals to and from the memory apparatus 200 through a plurality of pins P11 to P15. The plurality of pins P11 to P15 may include the first pin P11 that transmits the control information CA, the second pin P12 that transmits the control clock signal CA_CLK for synchronizing the control information CA, the third pin P13 that transmits and receives the data DQ, the fourth pin P14 that transmits and receives the data strobe signal DQS for synchronizing the data DQ, and the fifth pin P15 that transmits the read enable signal REB. Meanwhile, the plurality of pins P11 to P15 may further include a sixth pin that provides a reference voltage in addition thereto. Hereinafter, an operation is described in view of a pin of the memory controller 100.

Referring to FIG. 7, a first timing diagram 710 is a timing diagram for one read command and a second timing diagram 720 is a timing diagram for one program command.

In the first timing diagram 710 according to an example embodiment, the memory controller 100 may control power to the plurality of pins P11 to P15 based on a first queue (e.g., first queue 131) and a second queue (e.g., second queue 132). Here, the first queue (e.g., first queue 131) may store the control information CA including a read command and an address and the second queue (e.g., second queue 132) may store data transmission information for controlling transmission of read data.

Specifically, for a first transmission period (rCMD #1) of read control information, the memory controller 100 may transmit the control information CA and the control clock signal CA_CLK to the memory apparatus 200 through the first pin P11 and the second pin P12 according to the control information CA stored in the first queue (e.g., first queue 131). In this case, the memory controller 100 may maintain power to the first pin P11 and the second pin P12. The memory apparatus 200 may obtain read data by performing a read operation for a specific area according to the control information CA and prepare transmission of the read data.

Meanwhile, for the first transmission period (rCMD #1) of read control information, the second queue (e.g., second queue 132) may be in an empty state. For example, no transmission operation of the data DQ may be present. In this case, the memory controller 100 may shut off power to the third through the fifth pins P13 to P15. In other words, the third pin P13, the fourth pin P14, and the fifth pin P15 may have the power turned off and be changed into a power-down state (PD).

Then, for a first data transmission period (DATA #1), the memory controller 100 may supply power to the third through the fifth pins P13 to P15 according to the data transmission information stored in the second queue. The memory controller 100 may transmit the read enable signal REB to the memory apparatus 200 through the fifth pin P15. When the read enable signal REB of a toggle enable state (enable) is received, the memory apparatus 200 may start the prepared transmission of the read data. In this case, the memory controller 100 may receive the read data through the third pin P13 and receive the data strobe signal DQS through the fourth pin P14. The memory controller 100 may obtain accurate read data by sampling the read data using the data strobe signal DQS.

Meanwhile, for the first data transmission period (DATA #1), the first queue (e.g., first queue 131) may be in an empty state. For example, no transmission operation of the control information CA may be present. In this case, the memory controller 100 may shut off power to the first pin P11 and the second pin P12. In other words, the first pin P11 and the second pin P12 may have the power turned off and be changed into the power-down state (PD).

In the second timing diagram 720 according to an example embodiment, the first queue (e.g., first queue 131) may store the control information CA including a program command and an address and the second queue (e.g., second queue 132) may store data transmission information for controlling transmission of write data. The memory controller 100 may control power to the plurality of pins P11 to P15 based on the first queue (e.g., first queue 131) and the second queue (e.g., second queue 132).

Specifically, for a first transmission period (pCMD #1) of program control information, the memory controller 100 may transmit the control information CA and the control clock signal CA_CLK to the memory apparatus 200 through the first pin P11 and the second pin P12 according to the control information CA stored in the first queue (e.g., first queue 131). In this case, the memory controller 100 may maintain power to the first pin P11 and the second pin P12. The memory apparatus 200 may prepare a write operation for a specific area according to the control information CA.

Meanwhile, for the first transmission period (pCMD #1) of program control information, the second queue (e.g., second queue 132) may be in an empty state. For example, no transmission operation of the data DQ may be present. In this case, the memory controller 100 may shut off power to the third pin through the fifth pin P13 to P15. In other words, the third pin P13, the fourth pin P14, and the fifth pin P15 may have the power turned off and be changed into the power-down state (PD).

Then, for the first data transmission period (DATA #1), the memory controller 100 may turn on the power of the third pin P13 and the fourth pin P14 according to the data transmission information stored in the second queue (e.g., second queue 132). In this case, the memory controller 100 may identify a type of data indicated by the data transmission information stored in the second queue (e.g., second queue 132) and shut off power to the fifth pin P15 when the type of data is identified not to be read data. In this case, the memory controller 100 may transmit the write data to the memory apparatus 200 through the third pin P13 and transmit the data strobe signal DQS to the memory apparatus 200 through the fourth pin P14. The memory apparatus 200 may obtain accurate write data by sampling the write data using the data strobe signal DQS. The memory apparatus 200 may perform a program operation for a specific area according to the control information CA and store the write data in the cell array 230.

Meanwhile, for the first data transmission period (DATA #1), the first queue (e.g., first queue 131) may be in an empty state. For example, no transmission operation of the control information CA may be present. In this case, the memory controller 100 may shut off power to the first pin P11 and the second pin P12. In other words, the first pin P11 and the second pin P12 may have the power turned off and be changed into the power-down state (PD).

Meanwhile, the timing diagrams of FIG. 7 illustrate a transmission period of control information and a transmission period of data not overlapping each other, which is merely one example embodiment, and the transmission period of control information and the transmission period of data may be modified and implemented to have an overlapped portion.

Referring to FIG. 8, a third timing diagram through a fifth timing diagram 810 to 830 for a plurality of consecutive commands are illustrated. Contents duplicating the above descriptions are described briefly and may not be repeated.

In the third timing diagram 810 according to an example embodiment, for the first transmission period (rCMD #1) of read control information, the memory controller 100 may transmit first control information and the control clock signal CA_CLK to the memory apparatus 200 through the first pin P11 and the second pin P12 according to the first control information stored in the first queue (e.g., first queue 131). Then, when it is identified that the first queue (e.g., first queue 131) is in an empty state, the memory controller 100 may shut off power to the first pin P11 and the second pin P12. Further then, for a second transmission period (rCMD #2) of read control information, the memory controller 100 may supply power to the first pin P11 and the second pin P12 according to second control information stored in the first queue (e.g., first queue 131). The memory controller 100 may transmit the second control information and the control clock signal CA_CLK to the memory apparatus 200 through the first pin P11 and the second pin P12. Then, when it is identified that the first queue is in the empty state, the memory controller 100 may shut off power to the first pin P11 and the second pin P12.

Meanwhile, for the first transmission period (rCMD #1) of read control information, the memory controller 100 may shut off power to the third pin through the fifth pin P13 to P15 when it is identified that the second queue (e.g., second queue 132) is in an empty state. Then, for the first data transmission period (DATA #1), the memory controller 100 may supply power to the third pin through the fifth pin P13 to P15 according to first data transmission information stored in the second queue (e.g., second queue 132). The memory controller 100 may transmit the read enable signal REB to the memory apparatus 200 through the fifth pin P15, receive read data through the third pin P13 from the memory apparatus 200, and receive the data strobe signal DQS through the fourth pin P14. Then, for a second data transmission period (DATA #2), the memory controller 100 may maintain power to the third pin through the fifth pin P13 to P15 according to second data transmission information stored in the second queue (e.g., second queue 132) and transmit the read enable signal REB to the memory apparatus 200 through the fifth pin P15. The memory controller 100 may receive the read data through the third pin P13 from the memory apparatus 200 and receive the data strobe signal DQS through the fourth pin P14.

In the fourth timing diagram 820 according to an example embodiment, for a first transmission period (setCMD #1) of set control information, the memory controller 100 may transmit first control information and the control clock signal CA_CLK to the memory apparatus 200 through the first pin P11 and the second pin P12 according to the first control information stored in the first queue (e.g., first queue 131). The first control information may include a set command (for example, set feature command or the like) for setting a specific function or parameter. The parameter may include at least one of a voltage level for performing a program operation or a read operation and a voltage level of the reference voltage VREF. Then, for the second transmission period (rCMD #2) of read control information, the memory controller 100 may transmit second control information and the control clock signal CA_CLK to the memory apparatus 200 through the first pin P11 and the second pin P12 according to the second control information stored in the first queue (e.g., first queue 131). Further then, when it is identified that the first queue (e.g., first queue 131) is in an empty state, the memory controller 100 may shut off power to the first pin P11 and the second pin P12.

Meanwhile, for the first transmission period (setCMD #1) of set control information and the second transmission period (rCMD #2) of read control information, the memory controller 100 may shut off power to the third pin through the fifth pin P13 to P15 when it is identified that the second queue (e.g., second queue 132) is in an empty state. In other words, the memory controller 100 may shut off power to the third pin P13, the fourth pin P14, and the fifth pin P15 when it is identified that the second queue (e.g., second queue 132) is in the empty state. Then, for the second data transmission period (DATA #2), the memory controller 100 may supply power to the third pin through the fifth pin P13 to P15 according to second data transmission information stored in the second queue (e.g., second queue 132). The memory controller 100 may transmit the read enable signal REB to the memory apparatus 200 through the fifth pin P15, receive read data through the third pin P13 from the memory apparatus 200, and receive the data strobe signal DQS through the fourth pin P14.

In the fifth timing diagram 830 according to an example embodiment, for a second transmission period (pCMD #2) of program control information, the memory controller 100 may transmit second control information and the control clock signal CA_CLK to the memory apparatus 200 through the first pin P11 and the second pin P12 according to the second control information stored in the first queue (e.g., first queue 131). Then, when it is identified that the first queue (e.g., first queue 131) is in an empty state, the memory controller 100 may shut off power to the first pin P11 and the second pin P12. Further then, for a third transmission period (rCMD #3) of read control information, the memory controller 100 may supply power to the first pin P11 and the second pin P12 according to third control information stored in the first queue (e.g., first queue 131) and transmit the third control information and the control clock signal CA_CLK to the memory apparatus 200 through the first pin P11 and the second pin P12.

Meanwhile, for the first data transmission period (DATA #1), the memory controller 100 may supply power to the third pin through the fifth pin P13 to P15 according to first data transmission information stored in the second queue (e.g., second queue 132). The memory controller 100 may transmit the read enable signal REB to the memory apparatus 200 through the fifth pin P15, receive read data through the third pin P13 from the memory apparatus 200, and receive the data strobe signal DQS through the fourth pin P14. Then, when it is identified that the second queue (e.g., second queue 132) is in an empty state, the memory controller 100 may shut off power to the third pin through the fifth pin P13 to P15.

Then, for the second data transmission period (DATA #2), the memory controller 100 may identify a type of data indicated by second data transmission information stored in the second queue (e.g., second queue 132) and, when the type of data is identified not to be read data, supply power to the third pin P13 and the fourth pin P14 and shut off power to the fifth pin P15. The memory controller 100 may transmit write data through the third pin P13 and transmit the data strobe signal DQS through the fourth pin P14.

Figure 9:
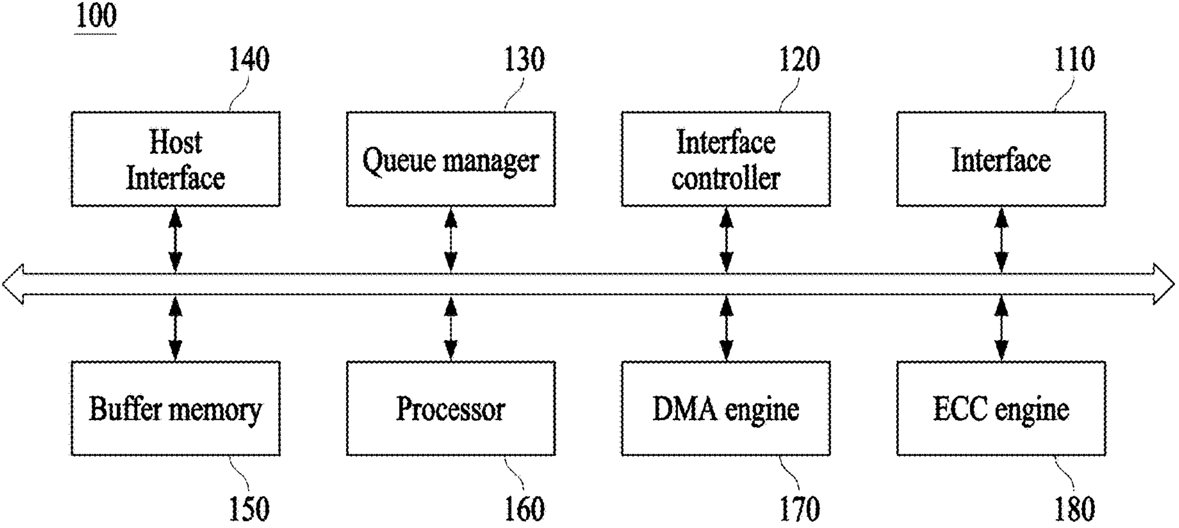
FIG. 9 is a block diagram for illustrating a memory controller in detail according to an example embodiment.

FIG. 9 is a block diagram for illustrating a memory controller in detail according to an example embodiment.

Referring to FIG. 9, the memory controller 100 according to an example embodiment may include the interface 110, the interface controller 120, and the queue manager 130. The above descriptions may be applied to these components. The memory controller 100 according to an example embodiment may further include at least one of a host interface 140, buffer memory 150, a processor 160, a direct memory access (DMA) engine 170, and an error correction code (ECC) engine 180. In an example embodiment, each of the queue manager 130, the DMA engine 170, and the ECC engine 180 may be implemented as a form of a dedicated circuit or implemented as a form of a portion of the processor 160.

The host interface 140 may transmit and receive a packet in communication with an external device (for example, a host device). A packet received from the external device may include a request, an address, or write data to be stored in the memory apparatus 200. A packet transmitted to the external device may include a response to a request or read data which is read from the memory apparatus 200.

The buffer memory 150 may be used as a temporal storage of data. The buffer memory 150 may efficiently perform data transmission between the external device and the memory apparatus 200. For example, the buffer memory 150 may store write data received through the host interface 140. The buffer memory 150 may store write data until the write data is transmitted to and stored in the memory apparatus 200. For another example, the buffer memory 150 may temporarily store read data received through the interface 110. The buffer memory 150 may store read data until the read data is transmitted to the external device. In an example embodiment, the buffer memory 150 may be a variety of volatile memory such as dynamic random access memory (DRAM), static RAM (SRAM), and synchronous DRAM (SDRAM), which is merely one example embodiment though, and the buffer memory 150 may be a variety of non-volatile memory such as NAND flash memory, NOR flash memory, FRAM, and RRAM.

The processor 160 may control overall operations of the memory controller 100. In other words, the processor 160 may control operations of other components of the memory controller 100. The processor 160 may process instructions and data between the memory apparatus 200 and the external device. For example, the processor 160 may interpret a request received from the external device and generate a corresponding command.

The DMA engine 170 may control data transmission between the buffer memory 150 and the memory apparatus 200 without an external processor (for example, a central processing unit (CPU) or the like) involved. As the DMA engine 170 processes data transmission work, a load of the external processor may be reduced and efficiency may be improved.

The ECC engine 180 may perform an error detection and correction function for read data which is read from the memory apparatus 200. For example, the ECC engine 180 may generate a parity bit for write data to be stored in the memory apparatus 200. The parity bit may be stored in the memory apparatus 200 along with the write data. An error in read data may be corrected through the read data which is read from the memory apparatus 200 and the parity bit, and the error-corrected read data may be output.

Figure 10:
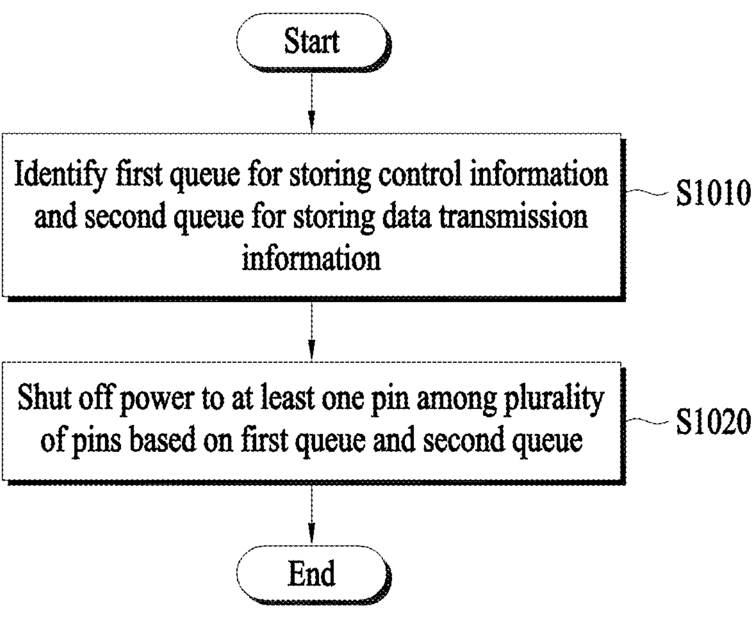
FIG. 10 is a diagram for illustrating an operating method of a memory controller according to an example embodiment.

FIG. 10 is a diagram for illustrating an operating method of a memory controller according to an example embodiment.

Referring to FIGS. 2 and 10, an operating method of the memory controller 100 according to an example embodiment may include identifying the first queue 131 for storing control information and the second queue 132 for storing data transmission information (operation S1010) and shutting off power to at least one pin among the plurality of pins P11 to P16 based on the first queue 131 and the second queue 132 (operation S1020).

The control information may be information for controlling an operation of the memory apparatus 200 storing or reading data and the data transmission information may be information for controlling transmission of the data. The memory controller 100 may include the plurality of pins P11 to P16 for communicating with the memory apparatus 200.

In an example embodiment, the operating method of the memory controller 100 may further include storing control information for controlling an operation of the memory apparatus 200 in the first queue 131 according to a request received from outside. In an example embodiment, the operating method of the memory controller 100 may further include storing data transmission information in the second queue 132 according to a request received from outside. These may be performed independently of the identifying the first queue 131 and the second queue 132 or the shutting off power.

In an example embodiment, the operating method of the memory controller 100 may further include transmitting the control information of the first queue 131 to the memory apparatus 200 through a command pin among the plurality of pins P11 to P16. In an example embodiment, the command pin may include the first pin P21 that receives the control information CA and the second pin P22 that receives the control clock signal CA_CLK for synchronizing the control information CA. In an example embodiment, the operating method of the memory controller 100 may further include transmitting and receiving data through a data pin among the plurality of pins P11 to P16 according to the data transmission information of the second queue 132. In an example embodiment, the data pin may include the third pin P23 that transmits and receives the data DQ and the fourth pin P24 that transmits and receives the data strobe signal DQS for synchronizing the data DQ. These may be performed independently of the identifying the first queue 131 and the second queue 132 or the shutting off power.

In an example embodiment, the identifying the first queue 131 and the second queue 132 (operation S1010) may be performed periodically.

In an example embodiment, the shutting off power to at least one pin (operation S1020) may include, when the first queue 131 is in an empty state, shutting off power to the command pin.

In an example embodiment, the shutting off power to at least one pin (operation S1020) may include, when the second queue 132 is in an empty state, shutting off power to the data pin. In an example embodiment, the shutting off power to the data pin may include, when the second queue 132 is in the empty state, shutting off power to the data pin and a read enable pin together among the plurality of pins P11 to P16.

In an example embodiment, the shutting off power to at least one pin (operation S1020) may further include, when the first queue 131 and the second queue 132 are in an empty state, shutting off power to a reference voltage pin that provides a reference voltage to the memory apparatus 200 among the plurality of pins P11 to P16.

In an example embodiment, the shutting off power to at least one pin (operation S1020) may include determining whether to shut off power to the read enable pin among the plurality of pins P11 to P16 based on a type of data indicated by the data transmission information stored in the second queue 132. In an example embodiment, the determining whether to shut off power to the read enable pin may include, when the type of the data is write data, shutting off power to the read enable pin while transmitting the write data through the data pin and, when the type of the data is read data, maintaining power to the read enable pin while receiving the read data through the data pin.

In another example embodiment, the shutting off power to at least one pin (operation S1020) may include determining whether to shut off power to the read enable pin among the plurality of pins P11 to P16 based on a type of a command included in the control information stored in the first queue 131. In an example embodiment, the determining whether to shut off power to the read enable pin may include, when the type of the command is a program command, shutting off power to the read enable pin while transmitting the data through the data pin and, when the type of the command is a read command, maintaining power to the read enable pin while receiving the data through the data pin.

In an example embodiment, the operating method of the memory controller 100 may further include shutting off power to each of the plurality of pins P11 to P16 when a power-down signal is received from outside.

Methods implemented as software modules or algorithms in the memory controller or the memory system according to the above-described example embodiments may be stored in a computer-readable recording medium as computer-readable codes or program instructions executable on a processor. Here, the computer-readable recording medium includes a magnetic storage medium (for example, floppy disks and hard disks), read-only memory (ROM), RAM, SSD, flash memory, and an optically readable medium (for example, CD-ROM and digital versatile discs (DVDs)). The computer-readable recording medium may be distributed among network-connected computer systems, so that the computer-readable codes may be stored and executed in a distributed manner. The medium may be readable by a computer, stored in a memory, and executed on a processor.

The example embodiments may be represented by functional block elements and various processing steps. The functional blocks may be implemented in any number of hardware and/or software configurations that perform specific functions. For example, an example embodiment may adopt integrated circuit configurations, such as memory, processing, logic, and/or look-up table, that may execute various functions by the control of one or more microprocessors or other control devices. Similarly to that elements may be implemented as software programming or software elements, the example embodiments may be implemented in a programming or scripting language such as C, C++, Java, assembler, etc., including various algorithms implemented as a combination of data structures, processes, routines, or other programming constructs. Functional aspects may be implemented in an algorithm running on one or more processors. Further, the example embodiments may adopt the existing art for electronic environment setting, signal processing, and/or data processing. Terms such as "mechanism," "element," "means," and "configuration" may be used broadly and are not limited to mechanical and physical configurations. The terms may include the meaning of a series of routines of software in association with a processor or the like.

The above-described example embodiments are merely examples, and other example embodiments may be implemented within the scope of the claims to be described later.

What is claimed is:

1. A memory controller comprising:

an interface including a plurality of pins configured to communicate with a memory apparatus;

a queue manager configured to control a first queue to store control information for controlling an operation of the memory apparatus for storing or reading data, and a second queue to store data transmission information for controlling transmission of the data; and an interface controller configured to shut off power to at least one pin among the plurality of pins based on the first queue and the second queue.

2. The memory controller of claim 1, wherein the plurality of pins includes a command pin configured to transmit the control information to the memory apparatus and a data pin configured to transmit the data to the memory apparatus according to the data transmission information or receive the data from the memory apparatus.

3. The memory controller of claim 2, wherein the interface controller is configured to:

when the first queue is in an empty state, shut off power to the command pin, and when the second queue is in an empty state, shut off power to the data pin.

4. The memory controller of claim 2, wherein the plurality of pins further includes a reference voltage pin configured to provide a reference voltage for identifying a state of a signal, and wherein the interface controller is configured to, when the first queue and the second queue are each in an empty state, shut off power to the reference voltage pin.

5. The memory controller of claim 2, wherein the control information includes at least one of a command for controlling the operation of the memory apparatus and an address indicating a storage area of the memory apparatus.

6. The memory controller of claim 2, wherein the plurality of pins further includes a read enable pin configured to transmit a read enable signal for controlling an output of the data to the memory apparatus.

7. The memory controller of claim 6, wherein the interface controller is configured to, when the second queue is in an empty state, shut off power to the data pin and the read enable pin.

8. The memory controller of claim 6, wherein the interface controller is configured to shut off power to the read enable pin based on a type of data indicated by the data transmission information stored in the second queue.

9. The memory controller of claim 8, wherein the interface controller is configured to:

when the data is write data, shut off power to the read enable pin while transmitting the write data through the data pin, and when the data is read data, maintain power to the read enable pin while receiving the read data through the data pin.

10. The memory controller of claim 1, wherein the interface controller is configured to shut off power to each of the plurality of pins according to a power-down signal received from outside.

11. An operating method of a memory controller including a plurality of pins configured to communicate with a memory apparatus, the operating method comprising:

identifying a first queue for storing control information for controlling an operation of the memory apparatus for storing or reading data and a second queue for storing data transmission information for controlling transmission of the data; and shutting off power to at least one pin among the plurality of pins based on the first queue and the second queue.

12. The operating method of claim 11, wherein the shutting off the power to the at least one pin includes:

when the first queue is in an empty state, shutting off power to a command pin configured to transmit the control information among the plurality of pins; and when the second queue is in an empty state, shutting off power to a data pin configured to transmit and receive the data among the plurality of pins.

13. The operating method of claim 12, wherein the shutting off the power to the data pin includes, when the second queue is in the empty state, shutting off the power to the data pin and power to a read enable pin together among the plurality of pins.

14. The operating method of claim 11, wherein the shutting off the power to the at least one pin further includes, when the first queue and the second queue are each in an empty state, shutting off power to a reference voltage pin configured to provide a reference voltage to the memory apparatus among the plurality of pins.

15. The operating method of claim 11, wherein the shutting off the power to the at least one pin includes determining whether to shut off power to a read enable pin among the plurality of pins based on a type of the data indicated by the data transmission information stored in the second queue.

16. The operating method of claim 15, wherein the determining whether to shut off the power to the read enable pin includes:

when the type of the data is write data, shutting off the power to the read enable pin while transmitting the write data through a data pin; and when the type of the data is read data, maintaining the power to the read enable pin while receiving the read data through the data pin.

17. The operating method of claim 11, further comprising shutting off power to each of the plurality of pins when a power-down signal is received from outside.

18. A memory system comprising:

a memory apparatus configured to store data; and a memory controller configured to identify a first queue for storing control information for controlling an operation of the memory apparatus for storing or reading the data and a second queue for storing data transmission information for controlling transmission of the data and to shut off power to at least one pin among a plurality of pins based on the first queue and the second queue.

19. The memory system of claim 18, wherein the memory controller is configured to:

when the first queue is in an empty state, shut off power to a command pin configured to transmit the control information among the plurality of pins, and when the second queue is in an empty state, shut off power to a data pin configured to transmit and receive the data among the plurality of pins.

20. The memory system of claim 19, wherein the plurality of pins further includes a read enable pin and a reference voltage pin which are connected to the memory apparatus, and wherein the memory controller is configured to:

when the second queue is in the empty state, shut off the power to the data pin and power to the read enable pin together, and when the first queue and the second queue are in the empty state, shut off power to the reference voltage pin.

* * * * *